US009563028B2

(12) United States Patent
Contag

(10) Patent No.: US 9,563,028 B2
(45) Date of Patent: Feb. 7, 2017

(54) METHOD TO MANUFACTURE AN OPTOELECTRONIC ASSEMBLY

(71) Applicant: CCS Technology, Inc., Wilmington, DE (US)

(72) Inventor: Karsten Contag, Gilching (DE)

(73) Assignee: CCS TECHNOLOGY, INC., Wilmington, DE (US)

(*) Notice: Subject to any disclaimer, the term of this patent is extended or adjusted under 35 U.S.C. 154(b) by 0 days.

(21) Appl. No.: 14/806,910

(22) Filed: Jul. 23, 2015

(65) Prior Publication Data
US 2015/0323748 A1 Nov. 12, 2015

Related U.S. Application Data

(63) Continuation of application No. PCT/US2014/013100, filed on Jan. 27, 2014.

(30) Foreign Application Priority Data
Jan. 31, 2013 (EP) .................................... 13153524

(51) Int. Cl.
G02B 6/36 (2006.01)
G02B 6/42 (2006.01)

(52) U.S. Cl.
CPC .............. G02B 6/4228 (2013.01); G02B 6/423 (2013.01); G02B 6/4204 (2013.01); G02B 6/424 (2013.01); G02B 6/4214 (2013.01); G02B 6/4239 (2013.01)

(58) Field of Classification Search
CPC .................................................. G02B 6/4228
(Continued)

(56) References Cited

U.S. PATENT DOCUMENTS 6,243,508 B1 6/2001 Jewell et al. .................... 385/14
6,891,994 B2 * 5/2005 Xu ........................ G02B 6/2935
385/24
(Continued)

FOREIGN PATENT DOCUMENTS

EP 1004907 A2 5/2000 ............. G02B 6/293
GB 2454813 A 5/2009 ............. H01S 5/022
(Continued)

OTHER PUBLICATIONS

Patent Cooperation Treaty International Search Report, Application No. PCT/US2014/013100, Jul. 24, 2014, 4 pages.
(Continued)

Primary Examiner — Sung Pak

(57) ABSTRACT

A method to manufacture an optoelectronic assembly comprises a step of structuring a first wafer to provide a plurality of optical components to change a beam of light in the optoelectronic assembly with a respective alignment structure being formed to couple the respective optical component to an optical connector. A second wafer is provided with a plurality of optoelectronic components. The first and second wafer are stacked on top of each other, aligned and bonded together. The bonded first and second wafers are separated into a plurality of optoelectronic modules. The optical connector is manufactured by structuring a third wafer so that the third wafer is provided with a plurality of optical connectors. The third wafer is separated into a plurality of the optical connectors. The optical fiber is coupled to one of the optical connectors and then is coupled to one of the separated optoelectronic modules.

15 Claims, 9 Drawing Sheets

(58) Field of Classification Search
USPC .......................................................... 385/77
See application file for complete search history.

(56) References Cited

U.S. PATENT DOCUMENTS

| | | | | |
|---|---|---|---|---|
| 7,223,619 | B2 | 5/2007 | Wang et al. ..................... | 438/26 |
| 7,224,856 | B2* | 5/2007 | Kathman ............. | G02B 6/4201 |
| | | | | 385/14 |
| 7,309,174 | B2 | 12/2007 | Farr ................................ | 385/94 |
| 7,358,109 | B2 | 4/2008 | Gallup et al. ................... | 438/65 |
| 7,520,679 | B2 | 4/2009 | Gallup et al. ................... | 385/88 |
| 7,873,246 | B2* | 1/2011 | Nagy ................. | G02B 6/29311 |
| | | | | 385/18 |
| 7,970,041 | B2* | 6/2011 | Arimoto ................ | H01S 5/141 |
| | | | | 372/101 |
| 9,164,249 | B2* | 10/2015 | Mathai | |
| 2003/0002809 | A1* | 1/2003 | Jian ....................... | G02B 6/423 |
| | | | | 385/73 |
| 2005/0105860 | A1 | 5/2005 | Oono et al. .................... | 385/88 |
| 2005/0185900 | A1 | 8/2005 | Farr | |
| 2005/0220427 | A1 | 10/2005 | Therisod ........................ | 385/92 |
| 2007/0029277 | A1 | 2/2007 | Jacobowitz et al. ............ | 216/24 |
| 2012/0027345 | A1 | 2/2012 | Castagna et al. ............... | 385/33 |

FOREIGN PATENT DOCUMENTS

| | | | |
|---|---|---|---|
| WO | WO00/40408 | 7/2000 | ............ B32B 31/18 |
| WO | WO2004/049521 A2 | 6/2004 | |
| WO | WO2006/031581 A2 | 3/2006 | ............... G02B 6/36 |
| WO | WO2012/006176 A1 | 1/2012 | ............... G02B 6/36 |

OTHER PUBLICATIONS

International Preliminary Report on Patentability with Written Opinion pertaining to International Patent Application No. PCT/US2014/013100 dated Aug. 4, 2015.

EP13153524.7 Search Report Dated Jul. 29, 2013.

Schmitt et al; "Full Wafer Microlens Replication by UV Imprint Lithography"; Microelectronic Engineering; 87 (2010) pp. 1074-1076.

Voelkel et al; "Wafer-Level Micro-Optics: Trends in Manufacturing, Testing and Packaging"; SPIE vol. 8169, pp. 81690C-1-81690C-12 (2011).

* cited by examiner

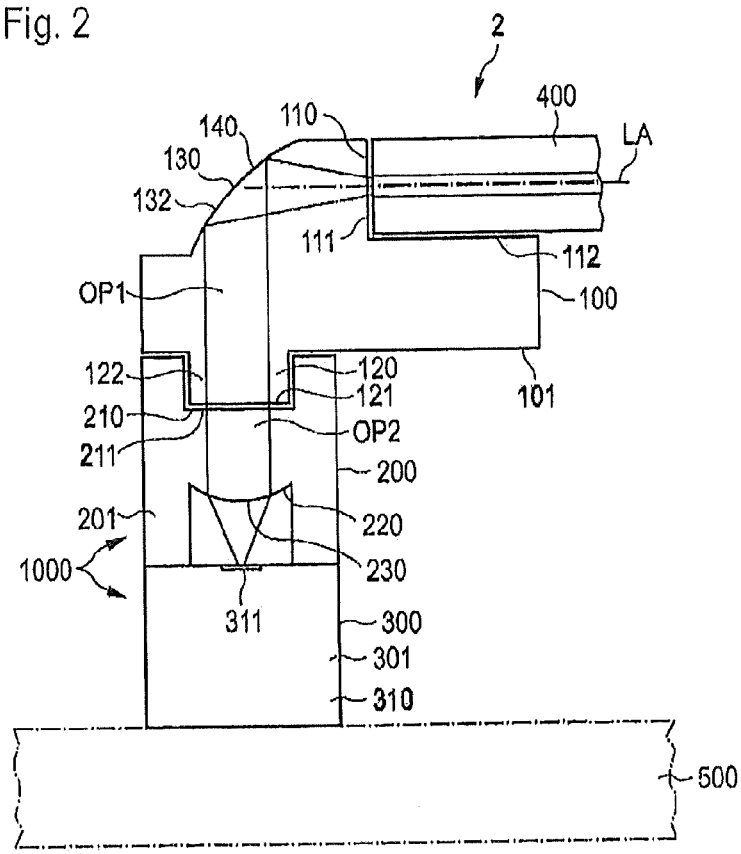

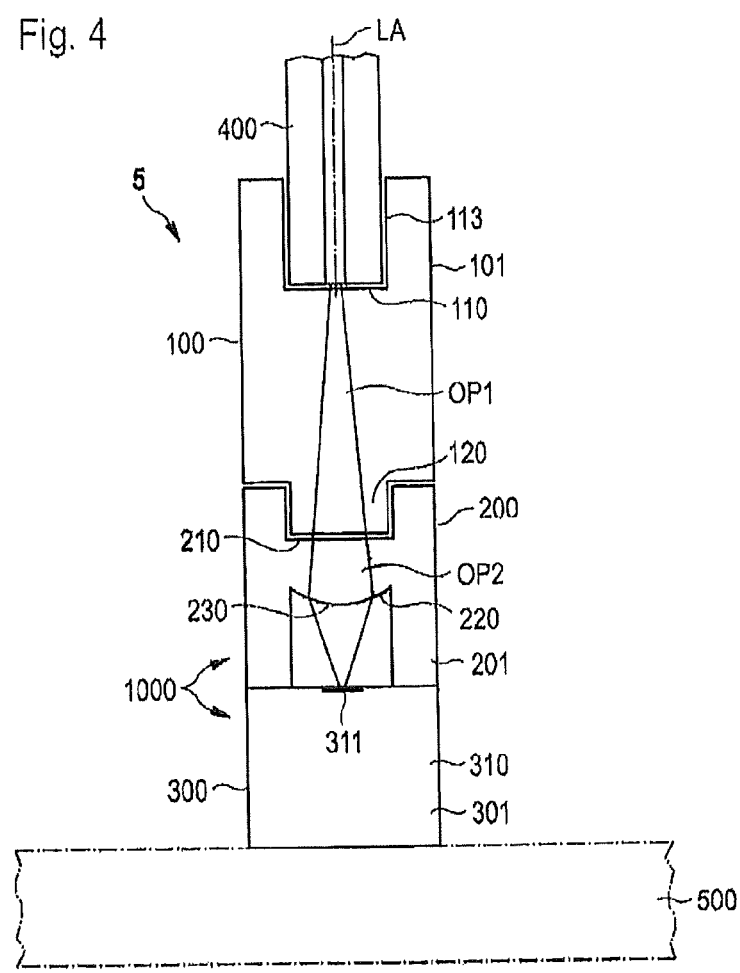

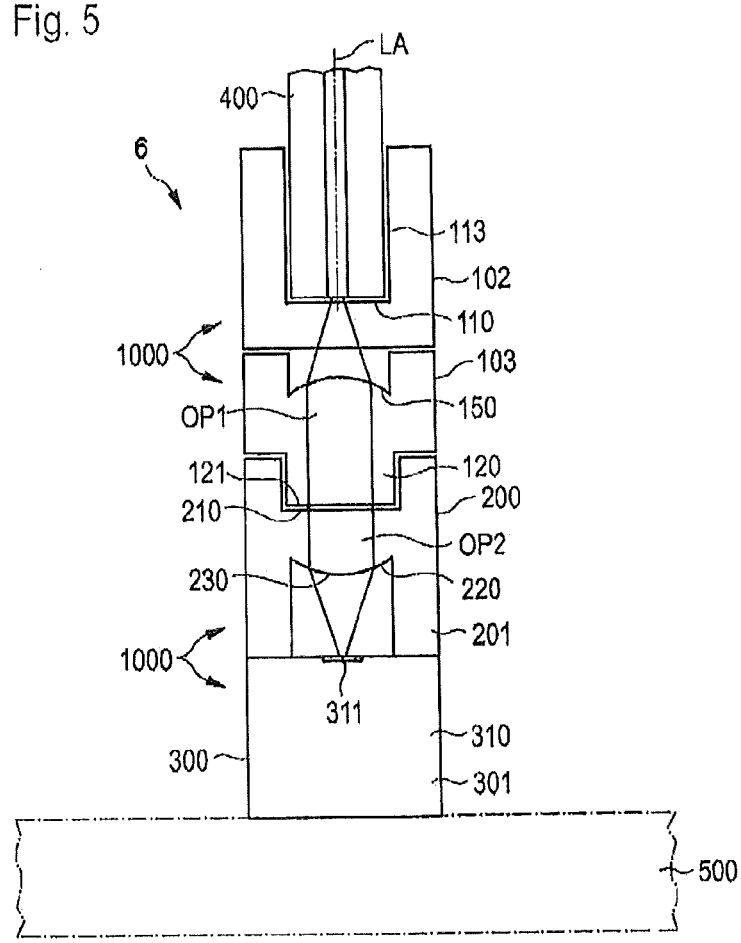

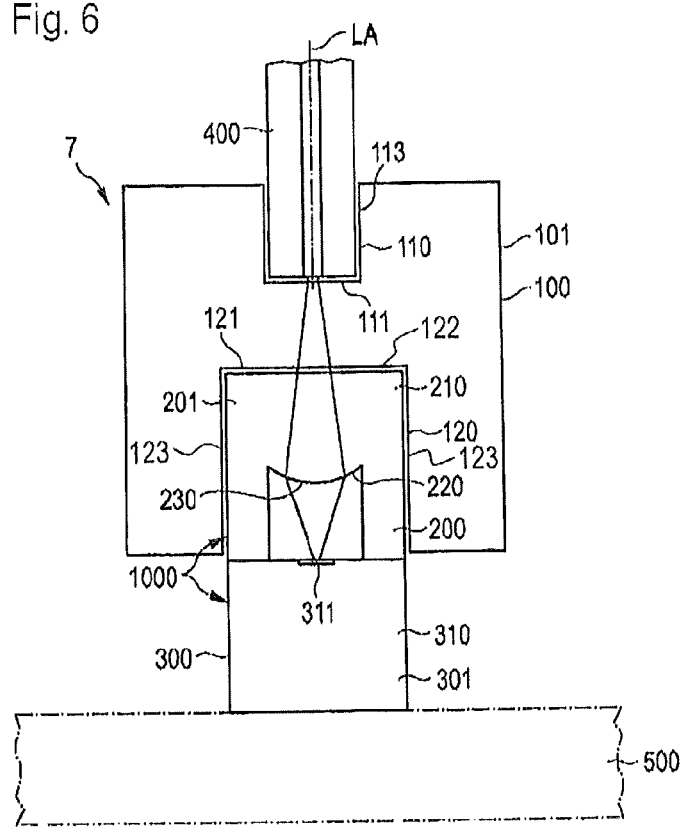

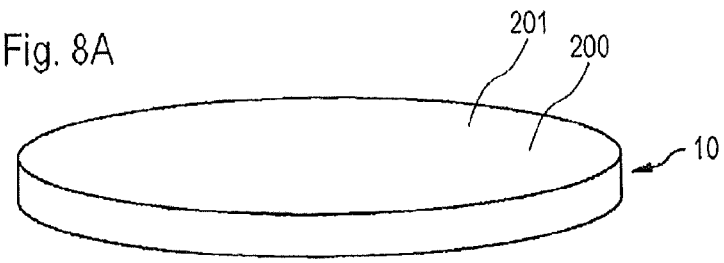
Fig. 8A
Fig. 8B
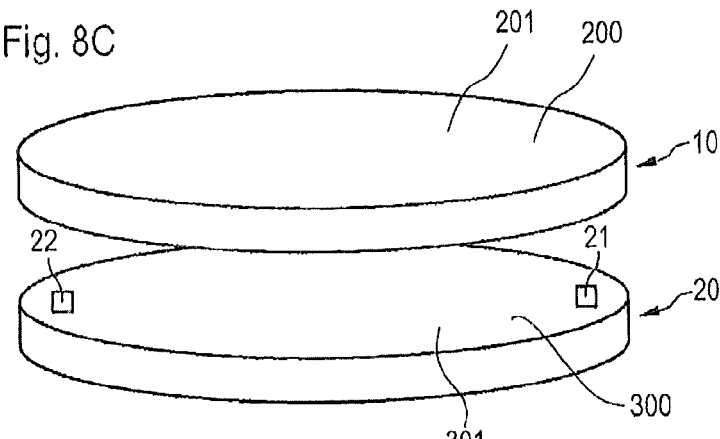
Fig. 8C
Fig. 8D

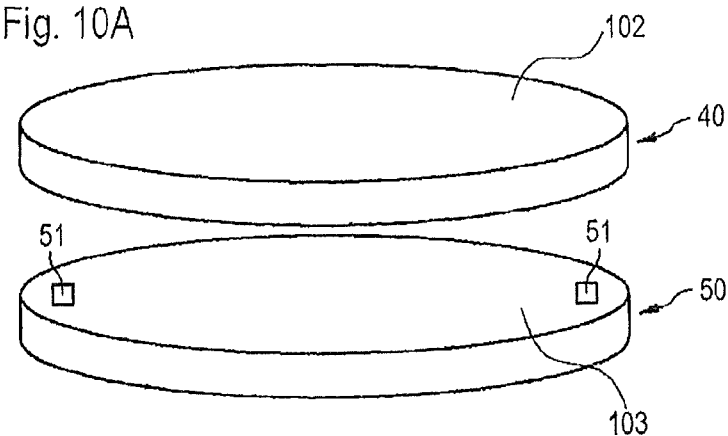

METHOD TO MANUFACTURE AN OPTOELECTRONIC ASSEMBLY

PRIORITY APPLICATIONS

This application is a continuation of International Application No. PCT/US14/13100, filed Jan. 27, 2014, which claims the benefit of priority to European Application No. 13153524.7, filed Jan. 31, 2013, both applications being incorporated herein by reference.

BACKGROUND

Field

The disclosure relates to a method to manufacture an optoelectronic assembly comprising an optical connector to couple at least one optical fiber to the optoelectronic assembly, an optical component to change a beam of light in the optoelectronic assembly and an optoelectronic component to convert the light into an electric signal or to convert the electric signal into the light. The disclosure is further directed to the optical connector and the optoelectronic assembly.

Technical Background

An optoelectronic assembly usually comprises an optoelectronic device, such as a photodiode or a Vertical Cavity Surface-Emitting Laser (VCSEL), to change an optical signal/light into an electric signal and vice versa. The light may be transferred in an optical fiber or an array of optical fibers, such as an optical fiber ribbon. In order to couple the light between the at least one optical fiber and the optoelectronic device with low loss, the at least one optical fiber and the optoelectronic device have to be properly aligned to each other.

According to another embodiment of an optoelectronic assembly, an optical component may be arranged between the optoelectronic device and the optical fiber/optical fiber array. The optical component may be configured to direct a beam of light coupled out of the optical fiber to an active area of the optoelectronic device. In order to change the beam of the light so that the light is coupled between the optical fiber/optical fiber array and the optoelectronic device with low loss, it is necessary to properly align the optical fiber, the optical component and the optoelectronic device to each other.

Several methods and configurations exist to couple an optical fiber to an optoelectronic device. Commonly known methods of coupling an optical fiber to an optoelectronic module involve active alignment of the optical fiber and the optoelectronic device. In order to accomplish an active alignment, alignment marks may be provided on a substrate of the module. Firstly the optoelectronic device is placed on the substrate in relation to the alignment marks. In a second step, the optical fiber is aligned in relation to the alignment marks so that light can be coupled between the end of the optical fiber and the optoelectronic device with low loss. The alignment procedure may be controlled by a camera system.

In case of coupling a plurality of single optical fibers or a plurality of optical fiber arrays to a plurality of optoelectronic devices it is required that the active alignment is done separately for every single pair of an optoelectronic device, the corresponding optical fiber/fiber array and an optical component or for linear arrays of such components. The alignment of the optical fibers/optical fiber arrays, the optical components and the optoelectronic devices is usually a complex and a time-consuming procedure which causes an unintentional high insertion loss in case of imprecise alignment.

It is a desire to provide a method to manufacture an optoelectronic assembly comprising an optical connector to couple at least one optical fiber to the optoelectronic assembly, an optical component to change a beam of light in the optoelectronic assembly and an optoelectronic component to convert the light into an electric signal or to convert the electric signal into the light which enables a precise and time-saving coupling of the at least one optical fiber and the optoelectronic device. It is a further desire to provide an optical connector which enables to precisely couple at least one optical fiber and an optoelectronic device in a time-saving manner. It is a further desire to provide an optoelectronic assembly which enables a precise and time-saving coupling of at least one optical fiber and an optoelectronic device.

SUMMARY

Embodiments disclosed in the detailed description include a method to manufacture an optoelectronic assembly and an optical connector to couple at least one optical fiber to an optoelectronic assembly.

An embodiment of a method to manufacture an optoelectronic assembly comprising an optical connector to couple at least one optical fiber to the optoelectronic assembly and an optical component to change a beam of light in the optoelectronic assembly and an optoelectronic component to convert the light into an electric signal or to convert the electric signal into the light, comprises the following steps: providing at least one optical fiber, providing the optical connector with a material being transparent for the light transferred in the at least one optical fiber, wherein the optical connector comprises a first coupling and aligning structure for coupling the at least one optical fiber to the optical connector and a second coupling and aligning structure for coupling the optical connector to the optical component, providing a first wafer with a material being transparent for the light transferred in the optical fiber, providing a second wafer comprising a plurality of identical ones of the optoelectronic component, wherein each of the optoelectronic components comprises a respective optoelectronic device to convert the light into the electric signal or to convert the electric signal into the light, structuring the first wafer to provide a plurality of identical ones of the optical components with a respective alignment structure being formed to couple the respective optical component to the optical connector, stacking and aligning the first and second wafer so that the light coupled in the respective alignment structure of the optical components of the first wafer is focused on a respective active area of the optoelectronic devices of the second wafer, bonding the first and the second wafer on top of each other, separating the bonded first and second wafer into a plurality of the optoelectronic modules, wherein each of the optoelectronic modules comprises one of the optoelectronic components and one of the optical components, coupling the at least one optical fiber to the optical connector, and coupling the optical connector to one of the plurality of the separated optoelectronic modules by coupling the second coupling and aligning structure of the optical connector to the alignment structure of said one of the separated optoelectronic modules.

According to an embodiment of an optical connector to couple at least one optical fiber to an optoelectronic assembly, the optical connector comprises a first coupling and aligning structure for coupling the at least one optical fiber to the optical connector, said first coupling and aligning structure having a surface for coupling light between the at least one optical fiber and the optical connector. The surface of the first coupling and aligning structure is configured to attach the at least one optical fiber to the first coupling and aligning structure and to couple light in and/or out of the optical connector. The surface of the first coupling and aligning structure is formed such that, in a state of the optical connector in which the at least one optical fiber is attached to the surface of the first coupling and aligning structure, the at least one optical fiber is aligned in relation to the optical connector to couple light between the surface of the first coupling and aligning structure and the at least one optical fiber. The optical connector comprises a second coupling and aligning structure for coupling the optical connector to an optoelectronic module including an optoelectronic device to convert light into an electric signal or to convert the electric signal into the light. The second coupling and aligning structure is configured to engage with an alignment structure of the optoelectronic module. The second coupling and aligning structure has a surface for coupling the light between the optoelectronic module and the optical connector. The surface of the second coupling and aligning structure is formed such that, in a state of the optical connector in which the second coupling and aligning structure is engaged with the alignment structure of the optoelectronic module, the optoelectronic module is aligned in relation to the optical connector to couple the light between the surface of the second coupling and aligning structure and the optoelectronic module and a beam of the light coupled between the optoelectronic module and the optical connector is kept unchanged by the surface of the second coupling and aligning structure. The optical connector is configured to provide an optical path between the surface of the first coupling and aligning structure and the surface of the second coupling and aligning structure to transfer light coupled in the optical connector at the surface of the first coupling and aligning structure to the surface of the second coupling and aligning structure and to transfer light coupled in the optical connector at the surface of the second coupling and aligning structure to the surface of the first coupling and aligning structure.

According to an embodiment of the optoelectronic assembly, the assembly comprises the optical connector as specified above and the optoelectronic module including the optoelectronic device to convert light into an electric signal or to convert the electric signal into the light. The optoelectronic module comprises a first material block and a second material block including the optoelectronic device to convert the light into the electric signal or to convert the electric signal into the light. A first part of the first material block is structured to form the alignment structure of the optoelectronic module to engage with the surface of the second coupling and aligning structure of the optical connector and a second part of the first material block is structured to form an optical device to direct a beam of the light towards an active area of the optoelectronic device. The first and second material block of the optoelectronic module are stacked on top of each other such that the surface of the second coupling and aligning structure of the optical connector engages with the alignment structure of the first part of the first material block of the optoelectronic module.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

BRIEF DESCRIPTION OF THE DRAWINGS

FIG. 2 shows another embodiment of an optical connector to couple at least one optical fiber to an optoelectronic device and an embodiment of an optoelectronic assembly including the optical connector;

FIG. 4 shows another embodiment of an optical connector to couple at least one optical fiber to an optoelectronic device and an embodiment of an optoelectronic assembly including the optical connector;

FIG. 5 shows another embodiment of an optical connector to couple at least one optical fiber to an optoelectronic device and an embodiment of an optoelectronic assembly including the optical connector;

FIG. 6 shows another embodiment of an optical connector to couple at least one optical fiber to an optoelectronic device and an embodiment of an optoelectronic assembly including the optical connector;

FIG. 8A shows a first wafer comprising a plurality of optical components;

FIG. 8B shows a second wafer comprising a plurality of optoelectronic components;

FIG. 8C shows an alignment of the first and the second wafers;

FIG. 8D shows stacked first and second optical wafers to manufacture a plurality of optoelectronic modules;

FIG. 9 shows a third wafer comprising a plurality of optical connectors;

FIG. 10A shows an alignment of a fourth wafer comprising a plurality of first coupling and aligning structures and a fifth wafer comprising a plurality of second coupling and aligning structures;

FIG. 10B shows stacked fourth and fifth wafers to manufacture a plurality of optical connectors.

DETAILED DESCRIPTION

Figure 1:
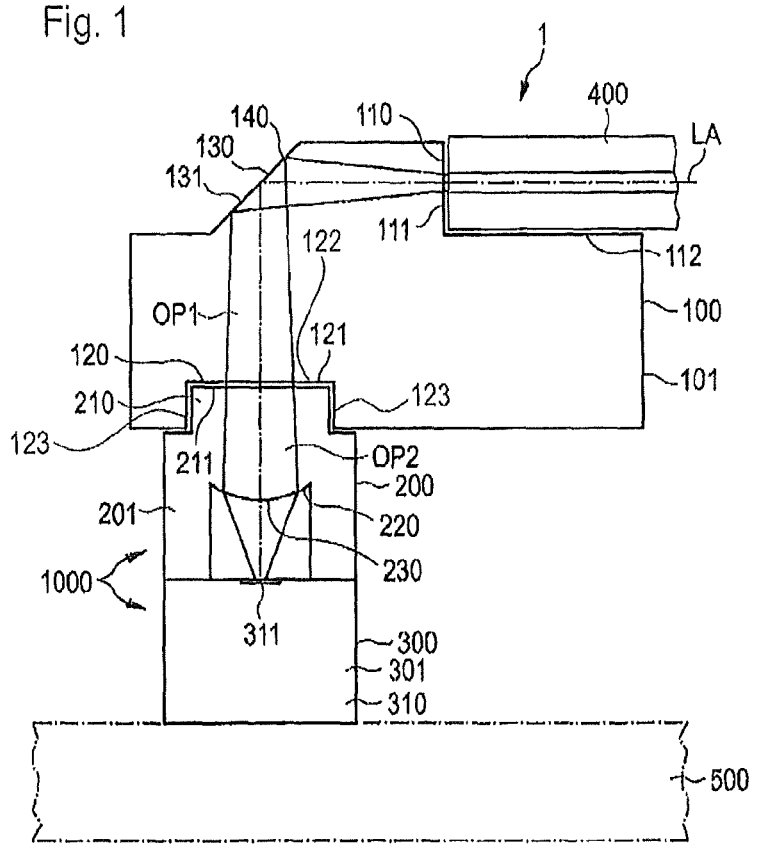
FIG. 1 shows an embodiment of an optical connector to couple at least one optical fiber to an optoelectronic device and an embodiment of an optoelectronic assembly including the optical connector.

FIGS. 1 to 6 show different embodiments of optoelectronic assemblies 1 to 7 which may be disposed on a printed circuit board 500. Each of the optoelectronic assemblies 1 to 7 comprises an optical connector 100 coupled to an optoelectronic module 1000. The optoelectronic module 1000 is configured to convert light into an electric signal or to convert an electric signal into light. The optoelectronic module 1000 comprises an optical component 200 comprising an alignment structure 210 to couple the optoelectronic module 1000 to the optical connector 100 and an optoelectronic component 300 comprising an optoelectronic device 310 to convert light into an electric signal or to convert an electric signal into light. Each of the optoelectronic assemblies may be mounted to a printed circuit board 500. Components having all of the optoelectronic assemblies 1 to 7 in common with each other are described in the following before referring to individual aspects of the different embodiments of the optoelectronic assemblies 1 to 7.

In the embodiments shown in FIGS. 1 to 6 the optical connector 100 comprises a coupling and aligning structure 110 which is configured to attach at least one optical fiber 400 for coupling the optical fiber to the optical connector 100. The coupling and aligning structure 110 is configured to attach a single optical fiber or a plurality of optical fibers, such as an array of optical fibers, for example, an optical fiber ribbon. The coupling and aligning structure 110 has a surface 111 to couple light in and/or out of the optical connector 100. The coupling and aligning structure 110 is formed such that, in a state of the optical connector 100 in which the at least one optical fiber 400 is attached to the coupling and aligning structure 110, the at least one optical fiber 400 is aligned in relation to the optical connector 100 to couple light between the surface 111 of the coupling and aligning structure 110 and the at least one optical fiber 400.

In the embodiments of the optoelectronic assemblies 1 to 7 shown in FIGS. 1 to 6, the optical connector further comprises a coupling and aligning structure 120 which is configured to engage with a structure 210 of the optoelectronic module 1000 for coupling the optical fiber 400 to the optoelectronic module 1000. The coupling and aligning structure 120 has a surface 121 to couple light in and/or out of the optical connector 100. The surface 121 of the coupling and aligning structure 120 may be configured to keep a beam of the light coupled in or out of the optical connector 100 unchanged. That means that the surface 121 does not influence the direction of the beam of the light and does not change the course of the beam of light, when the light passes through the surface 121. The coupling and aligning structure 120 is formed such that, in a state of the optical connector 100 in which the coupling and aligning structure 120 is engaged with the structure 210 of the optoelectronic module 1000, the optoelectronic module 1000 is aligned in relation to the optical connector 100 to couple light between the surface 121 of the coupling and aligning structure 120 and the optoelectronic module 1000. The second coupling and aligning structure is configured to align the optical connector 100 to the optoelectronic module 1000 in two directions within a given range, i.e. an x- and an y-direction being perpendicular arranged to each other so that, particularly, when coupling an optical fiber array to the first coupling and aligning structure 110, the optical fiber array aligns to the optoelectronic module 1000 within a prescribed alignment offset.

The optical connector 100 is configured to provide an optical path OP1 between the surface 111 of the coupling and aligning structure 110 and the surface 121 of the coupling and aligning structure 120 to transfer light coupled in the at least one optical connector 100 at the surface 111 of the coupling and aligning structure 110 to the surface 121 of the coupling and aligning structure 120 and to transfer light coupled in the at least one optical connector 100 at the surface 121 of the coupling and aligning structure 120 to the surface 111 of the coupling and aligning structure 110. In the case of coupling an optical fiber array comprising multiple optical fibers to the surface 111 of the first coupling and aligning structure 110, the optical path OP1 inside the optical connector comprises multiple optical channels. The light coupled out of each of the optical fibers of the optical fiber array is transferred via a respective one of the optical channels OP1 towards the surface 121 of the second coupling and aligning structure 120.

According to the embodiment of the optical connector shown in FIGS. 1, 2 and 3, the coupling and aligning structure 110 comprises a groove 112 to insert the at least one optical fiber 400 to be attached to the coupling and aligning structure 110. The coupling and aligning structure 110 is designed for passive alignment and attachment of the optical fiber. That means that the at least one optical fiber is correctly aligned in relation to the optoelectronic module by inserting the at least one optical fiber in the coupling and aligning structure 110. In contrast to an active alignment procedure, the alignment of the at least one optical fiber 400 in relation to alignment marks by using optical systems, such as cameras, or by measuring the attenuation of the light transferred from the at least one optical fiber to the optoelectronic device 310 can be omitted.

The groove 112 can be formed as a V-shaped or a U-shaped cavity in the material of the connector 100. The at least one optical fiber 400 may be attached to the optical connector 100 by gluing the at least one optical fiber to the groove 112 and particularly by gluing a front face of the single optical fiber or a respective front face of each of the optical fibers of an optical fiber array to the surface 111. The surface 111 which is configured in face of the fiber end of the at least one optical fiber 400 may be slanted in relation to the longitudinal axis of the groove 112 in order to minimize reflections and reduce the formation of bubbles when gluing the at least one optical fiber into the groove 112. The surface 111 may be slanted by an angle of less than 90° in relation to a longitudinal axis LA of the groove 112.

The optical connector 100 shown in FIGS. 1 to 3 further comprises a deflecting/reflecting element 130 which is configured to deflect light striking the deflecting/reflecting element 130 from one of the surface 111, 121 of the coupling and aligning structure 110 and the coupling and aligning structure 120 in a direction towards the surface 121, 111 of the other one of the coupling and aligning structure 110 and the coupling and aligning structure 120.

In particular, the deflecting/reflecting element 130 may comprise a surface 131 which is configured to deflect light striking the surface 131 from one of the coupling and aligning structures 110, 120 towards the other one of the coupling and aligning structures 120, 110. The surface 131 of the deflecting/reflecting element 130 may be layered with a reflective coating 140. The surface 131 may be configured to deflect an optical beam striking the surface from the direction of the coupling and aligning structure 110 or from the direction of the coupling and aligning structure 120 by an angle of approximately 90° so that the at least one optical fiber 400 can be orientated substantially in parallel to a printed circuit board 500 on which the optical assembly 1, 2 or 3 of the FIGS. 1, 2 and 3 is mounted.

For some applications it may be advantageous to have the at least one optical fiber oriented at an angle of, for example 30° to 45° to the printed circuit board 500, for example in order to increase the density of optical fiber connections. In this case the reflective surface 131 and the groove 112 can be tilted accordingly in relation to the surface of the printed circuit board 500. Reflection at the surface 131 of the deflecting/reflecting element 130 can be achieved either by total internal reflection or by the reflective coating 140 applied to the surface 131. The reflective coating may comprise gold or may be formed as an aluminum coating or may be formed by dielectric layers.

The optical component 200 is manufactured by processing, and particularly by structuring, a material block 201 to form an alignment structure 210 and at least one optical device 220. According to the embodiments of the optoelectronic assemblies 1, 2 and 5 to 7 shown in FIGS. 1, 2 and 4 to 6, the surface 121 of the coupling and aligning structure 120 is configured to engage with the alignment structure 210 of the optical component 200. The surface 121 of the coupling and aligning structure 120 may be inversely shaped in relation to the alignment structure 210 of the optical component 200 of the optoelectronic module 1000 to engage with the alignment structure 210 of the material block 201. The structure 210 of the optical component 200 comprises a surface 211 which is configured to couple light in and/or out of the optoelectronic module 1000. In the mated state of the embodiments of the coupling and aligning structure 120 of the optical connector 100 and the alignment structure 210 of the optical component, the optoelectronic module 1000 and the optical connector 100 are aligned to each other so that light coupled out of the surface 121 of the coupling and aligning structure 120 is coupled into the surface 211 of the optical component 200 and light coupled out of the surface 211 of the optical component 200 is coupled into the surface 121 of the coupling and aligning structure 120.

The optical component 200 is configured to provide an optical path OP2 to transfer light between the surface 211 of the material block 201 and the optical device 220. The optical device 220 is configured to focus light to an active area 311 of the optoelectronic device 310.

The optical connector 100, particularly the coupling and aligning structure 120, is designed such that it fits onto the alignment structure 210 of the optoelectronic module 1000 so that the optical connector 100 and the optoelectronic module are coupled in a self-adjusting manner to direct light coupled out of the at least one optical fiber 400 via the optical path OP1 of the optical connector and via the optical path OP2 of the optical component to the active area 311 of the optoelectronic device 310. The optical connector 100 can permanently be fixed to the optoelectronic module 1000 by using, for example, an index-matched UV-curable epoxy or acrylics. The adhesive can be partly or completely cured by UV-irradiation, but may also be cured thermally, for example by laser heating or in an oven. It is also possible to create a releasable connection between the optical connector 100 and the optical component 200. If it is intended to produce a releasable connection, index-matching gel may be used between the alignment structure 210 of the optoelectronic module and the optical connector in order to reduce reflections. It is also possible to apply an anti-reflective coating to both the surface of the alignment structure 210 and the coupling and aligning structure 120 of the optical connector.

The optoelectronic component 300 comprises a material block 301, for example a substrate, which contains the optoelectronic device 310. An active area 311 of the optoelectronic device is disposed on the surface of the substrate 301. The active area 311 is configured to emit or receive light.

The optical component 200 may be coupled to the optoelectronic component 300 by bonding the material blocks 201, 301. In the bonded state of the material blocks 201 and 301, the optical component 200 is aligned in relation to the optoelectronic component 300 so that a light beam is focussed from the optical device 220 towards the active area 311 of the optoelectronic device 310.

One of the surfaces of the material block 201 may be formed as a focussing lens which is designed such that the coupling efficiency between the optoelectronic component 310 and the at least one optical fiber 400 is maximized. The lens 220 can have a spherical shape. To compensate for aberrations the lens may also be formed with an aspheric shape. According to another possibility, the optical device 220 may be formed as a diffractive lens. This is particularly advantageous if the micro-optics structure 220 is formed by a lithography production method. The focussing lens 220 is designed and located such that the optical beam width is relatively large at the surface 211 of the optical component 200. This reduces the alignment accuracy that is needed between the optoelectronic module 1000 and the optical connector 100, thus allowing higher tolerances and reduced production cost. In case alignment tolerances remain unchanged, this leads to higher coupling efficiency on the average.

According to a further embodiment of the optical component 200 an anti-reflective coating 230 may be applied to the surface of the optical device 220 in order to reduce reflections which lead to a decreased coupling efficiency and/or signal distortion.

According to the embodiments of the optoelectronic assemblies 1 to 7 the width of the optical beam at the top surface 211 of the optical component 200 is larger than at the position of the active area 311 of the optoelectronic component 300. This means that the alignment tolerance of the optical connector 100 in lateral direction is higher than if the optical connector is directly attached to the active surface 311 of the optoelectronic device 310. At the same time the divergence angle of the optical beam at the top surface 211 of the optical component 200 is lower than at the position of the active area 311 of the optoelectronic device 310. This means that the position tolerance of the optical connector 100 is increased also in the vertical direction.

The increased alignment tolerance means that either a higher coupling efficiency can be achieved or the requirements on the accuracy of the manufacturing of the optical connector 100 can be decreased, thus lowering the production costs. The increased beam width leads to reduced tolerance against angular misalignment. Thus, the contact surfaces 121 and 211 of the coupling and aligning structure 120 and the alignment structure 210 should be designed as large as practically possible. In order to not disturb the transmission of light between the optical connector 100 and the optical component 200, a gel adapted to the refractive index of the material block 101 and the material block 201 may be disposed in the gap between the coupling and aligning structure 120 and the alignment structure 210.

If an optical fiber 400 is positioned in the coupling and aligning structure 110 so that the fiber end and the surface 111 are placed opposed to each other, a light beam which is transferred in the at least one optical fiber is coupled out at the end face of the at least one optical fiber and coupled in the surface 111. The light is transferred via the optical path OP1 in the material block 101 of the optical connector 100.

According to the embodiments of the optoelectronic assemblies 1, 2, 3 and 4 the light is reflected at the surface 131 of the deflecting/reflecting element 130 which may be formed as a slanted outer surface of the material block 101. The deflecting/reflecting element 130 enables that the light is directed towards the coupling and aligning structure 120. According to the embodiments of the optoelectronic assemblies 5, 6 and 7 the light coupled in the optical connector is directly transferred, i.e. without being deflected, towards the coupling and aligning structure 120.

The light is coupled out of the coupling and aligning structure 120 and coupled in the surface 211 of the alignment structure 210 of the optical component 200. The light coupled in the optical component 200 is transferred via an optical path OP2 of the material block 201 towards the optical device 220. The optical device 220 focuses the light beam to the active area 311 of the optoelectronic device 310.

FIGS. 1 to 6 show embodiments of an optoelectronic assembly 1, 2, 3, 4, 5, 6 and 7 comprising the optical connector 100 and the optoelectronic module 1000. The optoelectronic module 1000 comprises the material block 201 of the optical component 200 including the alignment structure 210 and the optical device 220. The optoelectronic module 1000 comprises the material block 301 of the optoelectronic component 300 with the optoelectronic device 310 and its active area 311 formed on a top surface of the material block 301.

FIG. 1 illustrates an embodiment of an optoelectronic assembly 1, wherein the coupling and aligning structure 110 of the optical connector 100 is formed as a groove 112 to couple the at least one optical fiber 400 to the optical connector 100. The alignment structure 210 of the optical component 200 is formed as a nose/protrusion in the material of the material block 201. The nose/protrusion 210 is configured to engage with the coupling and aligning structure 120 of the optical connector 100 and to couple light in and out of the optical component. The coupling and aligning structure 120 is formed as a recess/cavity in the material block 101 of the optical connector 100. The recess/cavity 120 is formed in the material block 101 with dimensions such that the protrusion 210 fits into the recess/cavity 120 of the optical connector 100. The alignment structure 210 may be formed with a cylindrical or rectangular shape. The alignment structure may have sharp edges. As shown in FIG. 1, the coupling and aligning structure 120 comprises a ground area 122 and side areas 123, wherein the side areas are arranged with an angel of 90° on the ground area of the coupling and aligning structure 120.

According to another embodiment of the optoelectronic assembly, the material block 201 may be shaped such that the coupling and aligning structure 120 has rounded edges between the ground area 122 and the side areas 123 of the coupling and aligning structure 120 in order to facilitate mating action between the material block 201 of the optical component and the material block 101 of the optical connector 100 and in order to minimize damage to the alignment structure 210 and the coupling and aligning structure 120 during mating.

The deflecting/reflecting element 130 comprises a slanted surface of the material block 101 to deflect light in the optical path OP1 from the coupling and aligning structure 110 towards the coupling and aligning structure 120.

FIG. 2 shows an embodiment of an optoelectronic assembly 2, wherein the coupling and aligning structure 110 of the optical connector 100 is formed as a groove 112 to couple the at least one optical fiber 400 to the optical connector 100. The deflecting/reflecting element 130 is formed as a curved reflective surface of the material block 101 of the optical connector 100. The coupling and aligning structure 120 is formed as a protrusion having a rectangular or circular cross-section in the material block 101 and the alignment structure 210 is formed as a recess in the material block 201. If a light beam is coupled via the surface 111 of the coupling and aligning structure 110 into the optical connector, the light is reflected at the curved reflective surface 131 of the deflecting/reflecting element 130 and directed towards the surface 121 of the coupling and aligning structure 120. The reflective surface 131 is curved such that the deflecting/reflecting element 130 acts as a focussing mirror. The alignment structure 210 is formed as a cavity to engage with the protrusion of the coupling and aligning structure 120.

The embodiment of the optoelectronic assembly 2 and particularly the curved reflective surface 131 of the deflecting/reflecting element 130 enables that, at the coupling surfaces between the optical connector 100 and the optical component 200, the beam width of the transferred light is increased and the divergence angle is decreased which leads to an increased positioning tolerance of the optical connector in all three spatial directions. Furthermore, the focussing power of the lens 220 can be decreased. This enables to reduce the effort of production, since the radius of curvature of the focussing lens 220 can be reduced or the lens can be positioned closer to the active area 311 of the optoelectronic device 310, leading to smaller overall form factors. By combining two focussing elements, i.e. the curved reflective surface 131 and the focussing lens 220, aberrations can be reduced, leading to increased coupling efficiency.

Figure 3A:
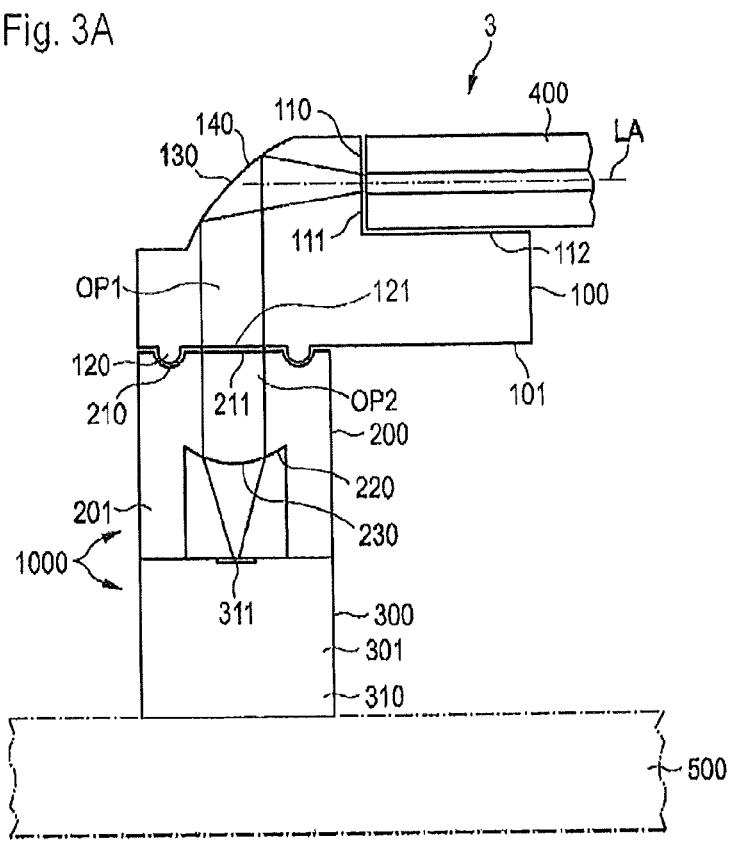
FIGS. 3A and 3B show another embodiment of an optical connector to couple at least one optical fiber to an optoelectronic device and an embodiment of an optoelectronic assembly including the optical connector.

FIG. 3A shows another possible embodiment of an optoelectronic assembly 3 comprising the optical connector 100 and the optoelectronic module 1000. In contrast to the embodiments of the optoelectronic assemblies of FIGS. 1 and 2, alignment structure 210 comprises linear or circular grooves which are arranged apart from each other. The coupling and aligning structure 120 of the optical connector 100 is inversely shaped and may contain ribs being spaced apart from each other which engage in the grooves of the optical component 200. The surface 121 of the coupling and aligning structure 120 to couple light in and out of the optical connector 100 is disposed between the protrusions of the coupling and aligning structure 120. The surface 211 of the alignment structure 210 of the optical component 200 is disposed between the cavities of the alignment structure 210 of the optical component 200.

Figure 3B:
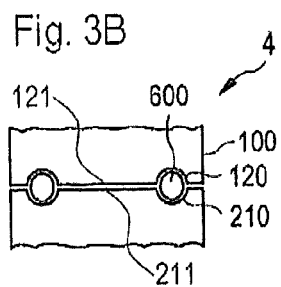

FIG. 3B shows a section of another embodiment of an optoelectronic assembly 4. In contrast to the embodiment of the optical assembly 3 of FIG. 3 both of the coupling and aligning structure 120 and the alignment structure 210 are formed as grooves or recesses in their respective material blocks 101 and 201. A ball 600 is disposed between the cavities of the optical connector and the cavities of the optical component 200. The gap between the grooves and the ball 330 may be filled with an adhesive. The surface 121 of the coupling and aligning structure 120 of the optical connector 100 is disposed between the cavities of the coupling and aligning structure 120. The surface 121 is configured to couple light in and out of the optical connector 100. The surface 211 of the alignment structure 210 of the optical component 200 is disposed between the cavities of the alignment structure 210. The surface 211 is configured to couple light in and out of the optical component 200.

In contrast to the embodiments of the optoelectronic assemblies shown in FIGS. 1 to 3B, embodiments of the optoelectronic assemblies 5, 6 and 7 shown in FIGS. 4, 5 and 6 do not comprise an optical connector with a deflecting/reflecting element. According to the embodiments of the optical connectors of the optoelectronic assemblies 4, 5 and 6, each of the optical connectors is configured so that the light transferred in the optical path OP1 of the optical connector 100 is directly, and without any reflection/deflection, transferred between the coupling and aligning structures 110 and 120. The advantage of these configurations is reduced production cost for the optical connector because of the omitted reflective surface and because in case of a wafer-scale production less area on the wafer per connector is used.

The coupling and aligning structure 110 of the embodiments of the optoelectronic assemblies 5 to 7 shown in FIGS. 4 to 6 are formed as a bore. The coupling and aligning structures 110 may alternatively be shaped as a groove to position the at least one optical fiber 400 as shown for the embodiments of the optical assemblies 1 to 3.

FIG. 4 shows an embodiment of an optoelectronic assembly 5. The optoelectronic assembly 5 comprises the optical connector 100 and the optoelectronic module 1000. The optical connector is formed without a reflective surface so that light is transferred straight on between the surface 111 of the coupling and aligning structure 110 and the surface 121 of the coupling and aligning structure 120. The surfaces 111 and 121 are configured to couple light in the coupling and aligning structure 110 and out of the coupling and aligning structure 120 and vice versa.

According to the embodiments 1 to 5 illustrated in FIGS. 1 to 4 the optical connector 100 is formed of a single material block 101 which is shaped to form the coupling and aligning structures 110, 120 or the deflecting/reflecting element 130. FIG. 5 shows an embodiment of an optoelectronic assembly 6 comprising the optical connector 100 and the optoelectronic module 1000. In contrast to the embodiments of the optoelectronic assemblies 1 to 5, the optical connector 100 comprises separate material blocks 102 and 103. The material block 102 is structured to form the coupling and aligning structure 110 in the material of the material block 102. A section of the material block 103 is structured to form the coupling and aligning structure 120 and an optical element 150 in the material of the material block 103.

The material blocks 102 and 103 are stacked on top of each other. The material blocks 102 and 103 are aligned so that light coupled in the material block 102 at the surface 111 of the coupling and aligning structure 110 escapes the material block 102 at a surface above the optical element 150 of the material block 103 and is coupled in the optical device 150. The surfaces on which the material blocks 102 and 103 are in contact with each other can be bonded together. The optical element 150 may be formed as a lens. The optical element 150 is configured so that light striking the optical element 150 is transferred with a reduced beam diameter towards the coupling and aligning structure 120. The material block 103 comprises the coupling and aligning structure 120 which may be formed as an elevation which engages with the alignment structure 210 formed as a recess of the optical component 200.

FIG. 6 shows an embodiment of an optoelectronic assembly 7, wherein the optical connector is formed as a single material block 101. The optoelectronic assembly 7 comprises the optical connector 100 and the optoelectronic module 1000. The optical connector 100 comprises the coupling and aligning structure 110. The surface 111 of the coupling and aligning structure 110 is formed as a recess in the material of the material block 101. The at least one optical fiber 400 may be attached with its front face to a ground area of the surface 111 of the coupling and aligning structure 110. The coupling and aligning structure 120 of the optical connector 100 is formed to at least partly surround the material block 201 of the optical component 200. To this purpose, a section of the optical connector 100 is formed as a cavity. The cavity may be placed over the material block 201 to align the optical connector 100 in relation to the optoelectronic module 1000 so that light coupled in the optical connector 100 at the coupling and aligning structure 110 is transferred via the optical paths OP1, OP2 towards the optical device 220. The surface 121 of the coupling and aligning structure 120 comprises a ground area and side areas. The ground area is in contact with an upper surface of the optical component 200. The side areas of the surface 121 of the coupling and aligning structure 120 surround the side areas of the optical component 200.

The optical component 200 comprises an optical device 220. The optical device 220 may be formed as a focussing lens which focuses the light to the active area 311 of the optoelectronic device 310 which is integrated in the substrate 301 of the optoelectronic component 300.

According to the embodiment of the optoelectronic assembly 7 of FIG. 6, the material block 201 itself provides alignment for the optical connector 100 and the optoelectronic module 1000. This variant of an optical assembly can be used, for example, if the precision of the dicing process to separate the material block 201 from a wafer is high enough for alignment between the optical connector 100 and the optoelectronic module 1000. A dicing process which is precise to a few microns is usually suitable enough for alignment between the optical connector 100 and the optoelectronic module 1000, especially given the relaxation of the alignment requirements by the optical configuration.

The coupling and aligning structure 120 comprises the ground area 122 to couple the light in and out of the optical connector and side areas 123 to align the optical connector 100 and the optical component 200 to each other. For the embodiment of the optoelectronic assembly 7 it is advantageous to make the side areas 123 of the coupling and aligning structure 120 of the optical connector 100 as long as possible in the contact area between the optical connector 100 and the optical component 200 of the optoelectronic module 1000 in order to achieve high accuracy in angular alignment. The optical connector may not only extend over the side faces of the optical component 200, but may even extend over the side faces of the optoelectronic component 300 for this purpose. The advantage of this variant is reduced manufacturing costs, both for the structures of the optical component 200 and the optical connector 100, since alignment structures in the material blocks 101 and 201 are omitted.

Figure 7:
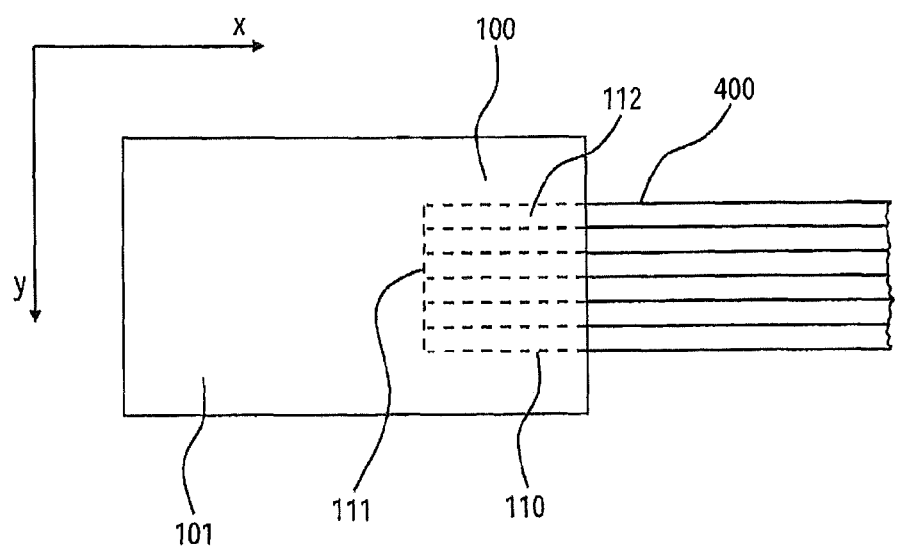
FIG. 7 shows an embodiment of an optical connector coupled with an array of optical fibers.

FIG. 7 shows a top view to an embodiment of the optical connector 100 comprising a coupling and aligning structure 110 for coupling multiple optical channels 400 arranged in an array to the optical connector 100. The optical connector 100 as shown in FIG. 7 may be provided in the embodiments of the optoelectronic assembly 1 to 7 for coupling an array of optical fibers to the optoelectronic assembly. The optical fibers may be configured as an optical fiber ribbon which is coupled to coupling and aligning structure 110 by attaching the end faces of the optical fibers to the surface 111 of the coupling and aligning structure 110. The coupling and aligning structure 110 may comprise a plurality of insertion holes 112 in the material block 101 of the optical connector 100, wherein each of the optical fibers of the optical fiber array is positioned in one of the cavities 112. Light coupled out each of the optical fibers of the optical fiber array is coupled in the surface 111 of the coupling and aligning structure 110 and transferred via a respective optical path/channel OP1 in the optical connector 100 towards the coupling and aligning structure 120. In order to couple the different optical channel of the optical connector 100 to the optical component 200 and to the optoelectronic component 300, the coupling and aligning structure 120 is configured to be aligned to the optoelectronic module 1000 in two directions x and y within a given range. The coupling and aligning structure 120 is formed so that the optical connector 100 is aligned in the x- and y-directions to the optical component 200 within a prescribed alignment offset so that the array of the optical fibers 400 aligns to the optoelectronic device 310 of the optoelectronic component 300.

According to an embodiment of a method of manufacturing the optoelectronic assemblies 1 to 7 the different components of the optoelectronic assemblies, i.e. the optical connector 100, the optical component 200 and the optoelectronic component 200 are produced as wafer-level based components. The production of the optical connector 100 may be accomplished simultaneously and in parallel with the production of the optoelectronic module 1000 comprising the optical component 200 and the optoelectronic component 300. Embodiments of a method of manufacturing the optoelectronic assemblies 1 to 7 are illustrated in FIGS. 8A to 8D, FIG. 9 and FIGS. 10A and 10B.

FIG. 8A illustrates the method of manufacturing a plurality of material blocks 201 of optical components 200 by processing a wafer 10. To this purpose, the wafer 10 is provided with a material being transparent for the light transferred in the optical fiber 400. The wafer 10 is structured to provide a plurality of identical ones of the optical components 200 with a respective alignment structure 210 being formed to couple the respective optical component 200 to the optical connector 100.

According to an embodiment of the method of manufacturing the optoelectronic assembly the wafer 10 is structured so that the respective alignment structure 210 of the optical components 200 on the wafer 10 is formed with a surface 211 being configured to engage with the second coupling an aligning structure 120 of the optical connector 100.

According to another embodiment of the method of manufacturing the optoelectronic assembly the wafer 10 is structured so that each of the optical components 200 is provided with a respective optical device 220, wherein each of the optical devices 220 is configured to focus the beam of the light to the respective area of the active areas 311 of the optoelectronic devices 310 in a state in which the wafers 10, 20 are aligned to each other.

FIG. 8B illustrates a method of manufacturing a plurality of material blocks 301 of optoelectronic components 310 by processing a wafer 20. The wafer 20 is provided with a plurality of identical ones of the optoelectronic component 300, wherein each of the optoelectronic components 300 comprises a respective optoelectronic device 310 to convert light into an electric signal or to convert the electric signal into the light. A respective active area 311 of each of the optoelectronic devices 310 is disposed on a surface of the wafer 20.

The wafer 20 may contain optoelectronic components 310 such as VCSELs or photodiodes. This can be done by planar semiconductor wafer production techniques. Besides VCSELs and photodiodes, any other optoelectronic component which converts light to electrical current or vice versa and where the direction of emission or reception of light is mainly perpendicular to the wafer plane, can be realized in the material of the optoelectronics wafer 20. It is likewise possible that the optoelectronics wafer 20 contains a number of photoelectronic devices, such as an array of VCSELs or an array of VCSELs and photodiode. It is also possible that additional electronics, such as laser drivers or trans-impedance amplifiers (TIAs) are located together with the optoelectronic components on the optoelectronics wafer 20 and will be part of the final optoelectronic modules 1000. The wafer substrate for the optoelectronic wafer 20 can be any kind of common semiconductor electronics wafer substrate, such as silicon, indium, phosphide, ceramics or glass.

The micro-optics wafer 10 comprising the alignment structures 210 and the micro-optics structures 220 may be produced parallel to production of the wafer 20 by using semiconductor wafer production techniques, such as precision injection molding and UV-imprint lithography. According to the UV-imprint lithography method a structured stamp is produced by lithographic methods using photo-sensitive material and this stamp is used to shape UV-curable resist material. This method may particularly be used to produce a micro-optic structure 220 on a glass wafer. Another possible production method is the application of photoresist material on a glass wafer, lithographic shaping of the photoresist material and subsequent transfer of the photoresist structure into the glass wafer by reactive ion etching. Another possible production method is precision injection molding.

The embodiment of the optoelectronic assembly 1 is designed for "flip-chip" optoelectronic components, where the active area, i.e. the area where the optical beam is emitted or received, and electrical connections are located on opposite sides of the optoelectronic wafer. It is also feasible to design the micro-optics wafer 10 with grooves on the bottom side, so that the electronic contact pads on the top side of the optoelectronic component become accessible after intermittent cutting on the micro-optics structure.

As an appropriate material for the micro-optics wafer 10 any material which is transparent at the wavelength of the optoelectronic component 310 and which is hard enough for secure attachment of the optical connector 100 can be used. The micro-optic wafer 10 may contain a material of glass, transparent polymers or a UV-curing resist such as PAK-01. Depending on the wavelength, semiconductor materials like silicon or indium phosphide can be used as well. For wavelengths which are greater than 1 μm, for example silicon can be used. Structuring of the micro-optics wafer 10 to produce the alignment structure 210 and the micro-optics structure 220 may be done using planar processes as known from the production of semiconductor electronics or MEMS (Micro-Electro-Mechanical-Systems). The structured micro-optic wafer can be produced by methods like precision injection molding, UV-imprint lithography or reactive ion etching (RIE) in combination with photoresist structuring.

FIGS. 8C and 8D illustrate the manufacturing of the optoelectronic modules 1000. As shown in FIG. 8C, the wafer 10 and the wafer 20 are stacked on top of each other and aligned so that the light coupled in the respective alignment structure 210 of the optical components 200 of the wafer 10 is focused on a respective active area 311 of the optoelectronic devices 310 of the wafer 20. After having aligned the wafers 10 and 20 the optical devices 220 of the wafer 10 are positioned in relation to the active area 311 of the optoelectronic component 300 of the wafer 20 such that each of the optical devices 220 focus light penetrating the alignment structure 210 of the wafer 20 on an active area 311 of a respective one of the optoelectronic devices 310 of the wafer 20. The wafers 10 and 20 may be aligned by using alignment marks 21, 22 disposed on at least one of the wafers 10 and 20 in combination with vision-based alignment. The alignment marks may be produced on wafer-scale. The alignment procedure is performed only once for the plurality of material blocks 201, 301 which are disposed on different wafers 10 and 20.

After alignment of the stacked wafers 10 and 20, the wafers are bonded on top of each other, as shown in FIG. 8D. In order to produce a plurality of optoelectronic modules 1000, the bonded wafers 10 and 20 are separated by a dicing process into a plurality of optoelectronic modules 1000. Each of the optoelectronic modules comprises a material block 201 of the optical component 200 and a material block 301 of the optoelectronic component 300. For bonding, techniques are used which use, for example epoxy. In the case of the use of a UV-curable resist material for the production of micro-structures 220 it is also possible to produce the micro-structures 220 directly on the optoelectronics wafer 20.

In order to finally manufacture the embodiments of optoelectronic assemblies 1 to 7, at least one optical fiber 400 is provided as a single optical fiber or as an array of a plurality of optical fibers, such as an optical fiber ribbon. Furthermore, an optical connector 100 is provided with a material being transparent for the light transferred in the at least one optical fiber 400, wherein the optical connector 100 comprises the coupling and aligning structure 110 for coupling the at least one optical fiber 400 to the optical connector 100 and with a second coupling and aligning structure 120 for coupling the optical connector 100 to the optical component 200. The at least one optical fiber 400 is coupled to the optical connector 100. The optical connector 100 is coupled to one of the plurality of the separated optoelectronic modules 1000 by coupling the second coupling and aligning structure 120 of the optical connector 100 to the alignment structure 210 of the separated optoelectronic module 1000.

FIG. 9 illustrates a method to manufacture an optical connector 100 as shown in FIGS. 1 to 4, 6 and 7. A wafer 30 is provided which comprises a material being transparent for the light transferred in the at least one optical fiber 400. The wafer 30 is structured to provide a plurality of identical ones of the coupling and aligning structure 110 for coupling the at least one optical fiber 400 to the respective optical connector 100 and a plurality of identical ones of the coupling and aligning structure 120 for coupling a respective one of the optical components 200 to the respective optical connector 100. Thus, the wafer 30 provides a plurality of identical ones of the optical connectors 100.

The wafer 30 is separated into a plurality of the optical connectors 100, wherein each of the optical connectors comprises a respective one of the coupling and aligning structure 110 and a respective one of the coupling and aligning structure 120. The wafer 30 may be separated into a plurality of material blocks 101 of the optical connectors 100 by a dicing process. The at least one optical fiber 400 is coupled to one of the separated optical connectors 100. The separated optical connector 100 can be coupled to one of the plurality of the separated optoelectronic modules 1000 by engaging the coupling and aligning structure 120 of the separated optical connectors 100 with the alignment structure 210 of the separated optoelectronic module 1000.

According to another embodiment of the method to manufacture the optoelectronic assembly the wafer 30 is structured so that the respective coupling and aligning structure 110 of the optical connectors 100 is formed with a respective surface 111 for coupling the light between the at least one optical fiber 400 and the respective optical connector 100. Furthermore, the wafer 30 is structured so that the respective coupling and aligning structure 120 of the optical connectors 100 is formed with a respective surface 121 for coupling light between the respective optical component 200 and the respective optical connector 100. The wafer 30 is structured so that each of the optical connectors 100 is provided with a respective optical path OP1 for transferring light in the respective optical connector 100 between the respective surface 111 of the coupling and aligning structure 110 of the optical connectors and the respective surface 121 of the second coupling and aligning structure 120 of the optical connectors.

The wafer 30 may be structured so that the respective surface 121 of the optical connectors 100 is formed to keep a beam of the light coupled in/out of the respective optical connector 100 at the respective surface 121 of the second coupling and aligning structure 120 of the optical connectors 100 unchanged. According to another embodiment the wafer 30 may be structured so that the respective surface 121 of the coupling and aligning structure 120 of the optical connectors 100 on the wafer 30 is formed to engage with the respective alignment structure 210 of the optical components 200 on the wafer 10.

In order to manufacture an optical connector 100 with a deflecting/reflecting element 130, the wafer 30 may be structured so that each of the optical connectors 100 is formed with a respective surface 131 of a deflecting/reflecting element 130 of the optical connectors, wherein the deflecting/reflecting element 130 is configured to deflect/reflect the light striking the respective surface 131 of the deflecting/reflecting element 130 of the optical connectors from one of the respective surface 111, 121 of the coupling and aligning structure 110, 120 of the optical connectors in a direction towards the respective surface 121, 111 of the other coupling and aligning structure 120, 110 of the optical connectors. The respective surface 131 of the deflecting/reflecting element 130 of the optical connectors 100 may be layered with a respective reflective coating 140.

The optical connectors for coupling the optical fibers to the optoelectronic modules may be produced by the same techniques as used for the production of the micro-optics wafer 10, for example, produced on wafer-level basis by methods like precision injection molding, UV-imprint lithography or reactive ion etching. The wafer 30 containing the optical connectors is then diced into single connectors. Alternatively single optical connectors can also be produced by precision injection-molding, using transparent material like for example a ULTEM resin.

FIG. 10A shows the manufacturing of the optical connector 100 of the optoelectronic assembly 6 comprising the material block 102 and the material block 103. In order to manufacture the optical connector 100 of the optoelectronic assembly 6, two wafers 40 and 50 are provided, wherein the wafers 40 and 50 are provided with a material being transparent for the light transferred in the at least one optical fiber 400. The wafer 40 is structured to form a plurality of the material block 102 shown in FIG. 5. After processing of the wafer 40, the wafer 40 contains a plurality of identical ones of the coupling and aligning structure 110, wherein each of the coupling and aligning structures 110 is configured for coupling the at least one optical fiber 400 to a respective one of the coupling and aligning structures 110. The wafer 50 is structured to provide a plurality of identical ones of the coupling and aligning structure 120, wherein each of the coupling and aligning structures 120 is configured for coupling the respective coupling and aligning structure 120 to a respective one of the alignment structures 210 of the optical components 200. The wafer 50 may be further structured to provide a plurality of identical ones of optical devices 150 to change the beam of the light, wherein each one of the optical devices 150 is configured as a lens to direct the beam of light towards the respective coupling and aligning structure 120.

Both of the wafers 40, 50 are stacked on top of each other and aligned so that each material block 102 of the wafer 40 is positioned above a respective one of the material blocks 103 of the wafer 50 such that light coupled in the coupling and aligning structure 110 of each of the material blocks 102 of the wafer 40 is transferred through the respective material block 102 towards the optical element 150 of the respective material block 103 of the wafer 50. The light strikes the respective optical element 150 and is coupled out of the material block 103 through the surface 121 of the respective coupling and aligning structure 120 of the wafer 50. In order to align both of the wafers 40 and 50, alignment marks 51 may be provided on at least one of the wafers 40, 50. The alignment marks may be produced on wafer-scale. The alignment procedure is performed only once for the plurality of material blocks 102, 103 which are disposed on different wafers 40, 50.

After aligning the wafers both wafers are bonded. FIG. 10B shows the bonded wafers 40 and 50. In order to manufacture the optical connectors 100 of the optoelectronic assembly 5, the bonded wafers 40 and 50 are separated by a dicing process into a plurality of the optical connectors 100, wherein each of the optical connectors 100 comprises one of the coupling and aligning structures 110 and one of the optical devices 150 and one of the coupling and aligning structures 120.

In order to manufacture an optoelectronic assembly 1 to 7, one of the plurality of optical connectors 100 separated from the wafer 30 is coupled to one of the plurality of optoelectronic modules 1000 separated from the bonded wafers 10 and 20 by engaging the coupling and aligning structure 120 of one of the optical connectors 100 with the alignment structure 210 of one of the optoelectronic modules 1000.

The embodiments of the optical connectors 100 shown in FIGS. 1 to 7 and optoelectronic modules 1000 shown in FIGS. 1 to 6 enable to decouple the manufacturing of optoelectronic modules from the preparation of optical fibers and optical connectors and to mate both parts later on in a simple manner, possibly by a manual process. The optoelectronic assemblies shown in FIGS. 1 to 6 are manufactured by separately producing the micro-optic wafer 10 comprising alignment structures and integrated optical devices such as lenses, the optoelectronic wafer 20 comprising the plurality of optoelectronic devices and the wafers 30, 40, 50 with a plurality of structures of optical connectors.

The advantage of the method for producing optoelectronic assemblies on the basis of wafer structuring are cost-savings for the mass production of fiber-coupled optoelectronics. The coupling and aligning structures 110, 120 are produced on wafer-scale rather than as single elements. This reduces both production and handling costs. Also the costs for the application of anti-reflective coatings for layering the surface of a deflecting/reflecting element 130 are much less than for the production of single elements.

Since the alignment structure 210 is integrated within the optoelectronic module 1000, the module can be placed on a printed circuit board with low precision pick-and-place machines. The high precision alignment means that coupling efficiency is high on the average, i.e. the energy per optical bit is low, and that this method is also suitable for low-cost coupling of small mode-field diameters, for example for single-mode fibers and/or high-speed optoelectronic components with small active area diameter. Since the preparation of the optical fibers 400 and optical connectors 100 can be completely separated from the production of the optoelectronics module 1000, both parts can be combined at a third location without the need for special equipment for fiber-optic production.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

We claim:

1. A method to manufacture an optoelectronic assembly comprising an optical connector to couple at least one optical fiber to the optoelectronic assembly, an optical component to change a beam of light in the optoelectronic assembly and an optoelectronic component to convert the light into an electric signal or to convert the electric signal into the light, comprising:

providing at least one optical fiber;
providing the optical connector with a material being transparent for the light transferred in the at least one optical fiber, wherein the optical connector comprises a first coupling and aligning structure for coupling the at least one optical fiber to the optical connector and a second coupling and aligning structure for coupling the optical connector to the optical component;
providing a first wafer with a material being transparent for the light transferred in the optical fiber;
providing a second wafer comprising a plurality of identical ones of the optoelectronic component, wherein each of the optoelectronic components comprises a respective optoelectronic device to convert the light into the electric signal or to convert the electric signal into the light;
structuring the first wafer to provide a plurality of identical ones of the optical components with a respective alignment structure being formed to couple the respective optical component to the optical connector;
stacking and aligning the first and second wafer so that the light coupled in the respective alignment structure of the optical components of the first wafer is focused on a respective active area of the optoelectronic devices of the second wafer;
bonding the first and the second wafer on top of each other;
separating the bonded first and second wafer into a plurality of the optoelectronic modules, wherein each of the optoelectronic modules comprises one of the optoelectronic components and one of the optical components;
coupling the at least one optical fiber to the optical connector; and
coupling the optical connector to one of the plurality of the separated optoelectronic modules by coupling the second coupling and aligning structure of the optical connector to the alignment structure of said one of the separated optoelectronic modules.

2. The method of claim 1, further comprising:
structuring the first wafer so that the respective alignment structure of the optical components on the first wafer is formed with a surface being configured to engage with the second coupling an aligning structure of the optical connector.

3. The method of claim 2, further comprising:
structuring the first wafer so that each of the optical components is provided with a respective optical device, wherein each of the optical devices is configured to focus the beam of the light to the respective active areas of the optoelectronic devices in a state in which the first and the second wafers are aligned to each other.

4. The method of claim 1, further comprising:
providing a third wafer with a material being transparent for the light transferred in the at least one optical fiber;
structuring the third wafer to provide a plurality of identical ones of the optical connector, wherein each of the optical connectors is provided with a respective one of the first coupling and aligning structure for coupling the at least one optical fiber to the respective optical connector and with a respective one of the second coupling and aligning structure for coupling a respective one of the optical components to the respective optical connector;
separating the third wafer into a plurality of the optical connectors, wherein each of the optical connectors comprises a respective one of the first coupling and aligning structure and a respective one of the second coupling and aligning structure;
coupling the at least one optical fiber to one of the separated optical connectors;
coupling one of the plurality of the separated optical connectors to said one of the plurality of the separated optoelectronic modules by engaging the second coupling and aligning structure of said one of the separated optical connectors with the alignment structure of said one of the separated optoelectronic modules.

5. The method of claim 4, further comprising:
structuring the third wafer so that the respective first coupling and aligning structure of the optical connectors is formed with a respective surface for coupling the light between the at least one optical fiber and the respective optical connector;
structuring the third wafer so that the respective second coupling and aligning structure of the optical connectors is formed with a respective surface for coupling light between the respective optical component and the respective optical connector; and
structuring the third wafer so that each of the optical connectors is provided with a respective optical path for transferring light in the respective optical connector between the respective surface of the first coupling and aligning structure of the optical connectors and the respective surface of the second coupling and aligning structure of the optical connectors.

6. The method of claim 5, further comprising:
structuring the third wafer so that the respective surface of the optical connectors is formed to keep a beam of the light coupled in/out of the respective optical connector at the respective surface of the second coupling and aligning structure of the optical connectors unchanged.

7. The method of claim 5, further comprising:
structuring the third wafer so that the respective surface of the second coupling and aligning structure of the optical connectors on the third wafer is formed to engage with the respective alignment structure of the optical components on the first wafer.

8. The method of claim 1, further comprising:
structuring the third wafer so that each of the optical connectors is formed with a respective surface of a deflecting/reflecting element of the optical connectors being configured to deflect/reflect the light striking the respective surface of the deflecting/reflecting element of the optical connectors from one of the respective surface of the first and the second coupling and aligning structure of the optical connectors in a direction towards the respective surface of the other one of the first and the second coupling and aligning structure of the optical connectors.

9. The method of claim 8, further comprising:
layering the respective surface of the deflecting/reflecting element of the optical connectors with a respective reflective coating.

10. The method of claim 1, further comprising:
providing a fourth wafer and a fifth wafer each with a material being transparent for the light transferred in the at least one optical fiber;
structuring the fourth wafer to provide a plurality of identical ones of the first coupling and aligning structure, wherein each of the first coupling and aligning structures is configured for coupling the at least one optical fiber to a respective one of the first coupling and aligning structures;
structuring the fifth wafer to provide a plurality of identical ones of the second coupling and aligning structure, wherein each of the second coupling and aligning structures is configured for coupling the respective second coupling and aligning structure to a respective one of the alignment structures of the optical components;
structuring the fifth wafer to provide a plurality of identical ones of optical devices to change the beam of the light, wherein each one of the optical devices is configured as a lens to direct the beam of light towards the respective second coupling and aligning structure;
stacking and aligning the fourth and fifth wafer so that the light coupled in a respective one of the first coupling and aligning structures of the fourth wafer strikes a respective one of the optical devices of the fifth wafer;
bonding the fourth and the fifth wafer on top of each other;
separating the bonded fourth and fifth wafer into a plurality of the optical connectors, wherein each of the optical connectors comprises one of the first coupling and aligning structures and one of the optical devices and one of the second coupling and aligning structures.

11. An optical connector to couple at least one optical fiber to an optoelectronic assembly, comprising:
a first coupling and aligning structure for coupling the at least one optical fiber to the optical connector, said first coupling and aligning structure having a surface for coupling light between the at least one optical fiber and the optical connector, said surface of the first coupling and aligning structure being configured to attach the at least one optical fiber to the first coupling and aligning structure and to couple light in and/or out of the optical connector, said surface of the first coupling and aligning structure being formed such that, in a state of the optical connector in which the at least one optical fiber is attached to the surface of the first coupling and aligning structure, the at least one optical fiber is aligned in relation to the optical connector to couple light between the surface of the first coupling and aligning structure and the at least one optical fiber;
a second coupling and aligning structure for coupling the optical connector to an optoelectronic module including an optoelectronic device to convert light into an electric signal or to convert the electric signal into the light, said second coupling and aligning structure being configured to engage with an alignment structure of the optoelectronic module, said second coupling and aligning structure having a surface for coupling the light between the optoelectronic module and the optical connector, said surface of the second coupling and aligning structure being formed such that, in a state of the optical connector in which the second coupling and aligning structure is engaged with the alignment structure of the optoelectronic module, the optoelectronic module is aligned in relation to the optical connector to couple the light between the surface of the second coupling and aligning structure and the optoelectronic module and a beam of the light coupled between the optoelectronic module and the optical connector is kept unchanged by the surface of the second coupling and aligning structure;

wherein the optical connector is configured to provide an optical path between the surface of the first coupling and aligning structure and the surface of the second coupling and aligning structure to transfer light coupled in the optical connector at the surface of the first coupling and aligning structure to the surface of the second coupling and aligning structure and to transfer light coupled in the optical connector at the surface of the second coupling and aligning structure to the surface of the first coupling and aligning structure.

12. The optical connector of claim 11, wherein the surface of the second coupling and aligning structure is formed to engage with the alignment structure of the optoelectronic module.

13. The optical connector of claim 11, further comprising:
a first material block, wherein a part of the first material block is structured to form the first coupling and aligning structure in the material of the first material block;
a second material block, wherein a first part of the second material block is structured to form the second coupling and aligning structure and a second part of the second material block is structured to form an optical element in the material of the second material block, wherein the optical element is configured to direct the beam of the light towards the second coupling and aligning structure;
wherein the first and second material blocks are stacked on top of each other.

14. An optoelectronic assembly, comprising:
the optical connector of claim 11;
the optoelectronic module including the optoelectronic device to convert light into an electric signal or to convert the electric signal into the light;
wherein the optoelectronic module comprises a first material block and a second material block including the optoelectronic device to convert the light into the electric signal or to convert the electric signal into the light;
wherein a first part of the first material block is structured to form the alignment structure of the optoelectronic module to engage with the surface of the second coupling and aligning structure of the optical connector and a second part of the first material block is structured to form an optical device to direct a beam of the light towards an active area of the optoelectronic device;
wherein the first and second material block of the optoelectronic module are stacked on top of each other such that the surface of the second coupling and aligning structure of the optical connector engages with the alignment structure of the first part of the first material block of the optoelectronic module.

15. The optoelectronic assembly of claim 14, wherein the first material block of the optoelectronic module comprises a surface being configured to couple the light in and/or out of the optoelectronic module;
wherein the second coupling and aligning structure of the optical connector and the alignment structure of the first part of the first material block of the optoelectronic module are configured such that the optical connector and the optoelectronic module are aligned to each other so that the light coupled out of the surface of the second coupling and aligning structure of the optical connector is coupled in the surface of the first material block of the optoelectronic module and the light coupled out of the surface of the first material block of the optoelectronic module is coupled in the surface of the second coupling and aligning structure of the optical connector;
wherein the first material block of the optoelectronic module is configured to provide an optical path to transfer light between the surface of the alignment structure of the first material block of the optoelectronic module and the optical device of the first material block of the optoelectronic module;
wherein the optical device of the first material block of the optoelectronic module is configured as a lens to focus the light to the active area of the optoelectronic device or to focus the light from the active area of the optoelectronic device to the surface of the second coupling and aligning structure of the optical connector.

* * * * *